United States Patent [19]

Uttinger

[11] Patent Number: 6,006,615
[45] Date of Patent: Dec. 28, 1999

[54] REMOTE DATA ACQUISITION SYSTEM

[76] Inventor: Michael Joseph Uttinger, 167 Ocean Beach Road, Mount Maunganui, New Zealand, 3002

[21] Appl. No.: 09/011,431

[22] PCT Filed: Aug. 7, 1996

[86] PCT No.: PCT/NZ96/00079

§ 371 Date: Apr. 10, 1998

§ 102(e) Date: Apr. 10, 1998

[87] PCT Pub. No.: WO97/05768

PCT Pub. Date: Feb. 20, 1997

[30] Foreign Application Priority Data

Aug. 10, 1995 [NZ] New Zealand ............................ 272754

[51] Int. Cl.$^6$ ..................................................... G01N 33/00
[52] U.S. Cl. ................................................................ 73/866
[58] Field of Search .................................. 73/865.8, 149, 73/296, 866; 374/101, 102, 142, 143; 119/14.17, 14.19; 340/870.01, 870.02, 870.09, 870.16, 870.17

[56] References Cited

U.S. PATENT DOCUMENTS 3,320,805  5/1967  Kahle .
4,612,537  9/1986  Maltais et al. .
4,672,842  6/1987  Hasselmann ............................ 374/142
4,788,648  11/1988  Ferretti et al. .
4,833,618  5/1989  Verma et al. .

FOREIGN PATENT DOCUMENTS

| 0 186 779 | 7/1986 | European Pat. Off. . |
|---|---|---|
| 0 245 758 | 11/1987 | European Pat. Off. . |
| 0 253 546 | 1/1988 | European Pat. Off. . |
| 0 256 653 | 2/1988 | European Pat. Off. . |
| 0 266 990 | 5/1988 | European Pat. Off. . |
| 0 168 640 | 1/1996 | European Pat. Off. . |
| 0 173 093 | 3/1996 | European Pat. Off. . |
| 222471 | 9/1989 | New Zealand . |
| WO 86/06162 | 10/1986 | WIPO . |

*Primary Examiner*—Robert Raevis
*Attorney, Agent, or Firm*—Darby & Darby

[57] ABSTRACT

The present invention relates to a remote data acquisition system including a sensor included into a storage device, the sensor capable of sensing at least one parameter of the material stored in the storage device, the remote data acquisition system also including transmission means associated with the sensor capable of outputting the information sensed by the sensor, or a data storage device to store the information sensed.

6 Claims, 2 Drawing Sheets

REMOTE DATA ACQUISITION SYSTEM

TECHNICAL FIELD

This invention relates to a remote data acquisition system.

Reference throughout this specification shall be made to use of the present invention in relation to the dairy industry. It should be appreciated however that the principles of the present invention can be applied to other industries.

Reference throughout the specification on shall also be made to the data collected in accordance with the present invention as being temperature, however again it should be appreciated that the present invention can apply to other parameters.

BACKGROUND ART

Milk is a perishable product, the quality of which is dependent on a number of parameters. One of the most significant parameters affecting the quality of milk is temperature.

During the milking process, milk leaves the cow at approximately 37° C. As the milk passes through the milking machine it loses heat. The milk also passes through a water chiller or heat exchanger which chills the milk down to approximately 18° C. before the milk enters a milk vat. The milk vat is also refrigerated to cool the milk down even further.

The growth of bacteria in the milk is directly affected by the temperature of the milk. Bacterial growth is exponential. The longer the milk stays at a high temperature, the greater the bacterial growth and thus the more adverse the quality of the milk.

When the milk is collected by a tanker from the milk vat, the temperature of the milk is recorded to give an indication if the milk vat is cooling the milk appropriately or to act as a indicator if samples of the milk taken test high for bacterial growth.

While the temperature of the milk as it leaves the vat gives an indication as to the possible quality of the milk, this is not an accurate indication as the milk may have been sitting a high temperature for a period of time before collection.

One poor quality batch of milk can contaminate other milk held in the tanker. Thus, a whole tanker full of milk can be wasted. Alternatively, poor quality milk is used in less profitable products such as casein instead of milk powder.

Thus, it is possible for literally millions of dollars per annum to be wasted through the inadvertent contamination of milk or low quality milk in general.

These problems have been recognised internationally. Previously the temperature of milk at the time of tanker collection was recommended to be in the order of 7° C. It is now likely that there may be a ruling that requires milk temperatures to be only 5° C. at the time of tanker collection.

This ruling may be difficult to effect. This is because the temperature of milk entering the milk vat after exiting the chiller system heat exchanger may be in the range of 14–20° C. The current deadline requires the temperature to be reduced to 7° C. within the three hour period. It may also be a requirement that milk is chilled to 5° C. in the three hour period, however there is presently no means of monitoring this.

Without accurate information as to whether the requirements for milk temperature are met, it is difficult for dairy factories to make appropriate operational decisions. Traditionally these decisions have been made on factors such as history, local knowledge, averaging, weather allowances and guess work.

This is further complicated by the seasonal trends in the dairy industry. For commencement of the season there is gradual increase to the peak or flush period of the dairy season. This flush period may last for approximately 10 days and the downward trend begins, ongoing until the season ends.

Understandably all these variations can lead to costly mistakes made in operational procedures as there is little data on which to base decisions or predictions.

A number of devices have been developed to combat the problems associated with retaining milk in a vat over time.

Once such device is described in WO 94/16552, Maasland. The device described in this specification is used to automatically activate a milk vat cooler once a specific level of milk is contained in the vat. Milk level sensors are positioned inside the vat to give an indication of the amount of milk contained, and to activate the cooling device. The device also logs temperature measurements for each animal's milk which is added to the vat.

However, this device cannot provide any indication of the quality of milk stored within the vat. The device only allows automatic activation of a milk vat's cooler mechanism depending on the amount of milk retained in the vat.

Another related device is described in U.S. Pat. No. 4,612,537, Meltais. The device described in this specification is a warning device which includes temperature sensors in a milk vat. The temperature sensors are used to determine the temperature of milk contained within the vat, and trigger an alarm signal if the milk temperature in the vat rises above a pre-determined value.

However, the device described in this specification cannot provide any indication of the equality of milk stored within the milk vat. This device may only give a warning when the milk temperature exceeds a certain threshold value.

It is an object of the present invention to address the foregoing problems or at least to provide the public with a useful choice.

Further aspects and advantages of the present invention will become apparent from the following description which is given by way of example only.

DISCLOSURE OF INVENTION

According to one aspect of the present invention there is provided a remote data acquisition system including
a sensor included into a storage device,
the sensor capable of sensing at least one parameter of the material stored in the storage device,
the remote data acquisition system also including transmission means associated with the sensor capable of outputting the information sensed by the sensor, or
a data storage device to store the information sensed.

According to an alternate aspect of the present invention there is provided a method of allocating the type of processing accorded to material collected from a storage device wherein the storage device incorporates at least one sensor capable of reading parameters of material held within the storage device,
characterised by the steps of:
a) outputting the information sensed from the sensor to a central processing station, and
b) using the output information to coordinate the type of processing accorded to the material within the storage device.

Reference shall now be made to the material as being milk and to the storage device as being a milk vat. It should be appreciated however that the present invention can be used in relation to other materials and other storage devices.

In preferred embodiments of the present invention the primary parameter sensed by the sensor is temperature. However, it should be appreciated that other parameters may be sensed instead of, or in addition to temperature.

For example, the acidity of the milk may be sensed, its density, conductivity, turbidity or perhaps fat content. However, in preferred embodiment the parameters beings sensed are parameters which affect the quality of the milk.

Other parameters that could be measured in addition to temperature and volume may include monitoring of the electrical network. This could highlight any inadequate power supplies. For example, voltage and current demands may be monitored showing the uses of power together graphical trends highlighting the performances of the farm dairy electrical system. Some examples of this include voltage/current demands on the dairy hot water system used for cleaning purposes. This can provide proof of water temperature.

Other electrical parameters which can be measured are the voltage/current demands on the farm dairy pumping system responsible for movement of milk from producing dairy cow through to the milk vat.

The voltage/current demands on the farm dairy lighting system may also be measured.

The clean in place (CIP) equipment may be monitored along with its efficiencies. For example, water temperature and volumes could be monitored to ensure food hygiene standards are met with the automated CIP system or alternative methods used for cleaning milking machinery.

The temperature of the water supplied or used in relation to the refrigeration system may also be monitored, this could include temperature readings of water both entering and exiting the chiller system.

The temperature sensor may come in a variety of forms. For example, he sensor may be a simple thermistor, thermopile or any other temperature sensing device.

In preferred embodiments the information collected by the sensor can be used to provide a temperature profile of the material in the storage device such as for milk held in the vat. Temperature profile gives considerably more information as to the potential quality of the milk than does the single reading of the milk temperature as it is being taken from the milk vat.

The temperature of the milk in the vat may be measured during the milk holding period. Constant readings may be taken to analyse any temperature change. This facility could be critical where alternative/skip-a-day collections are completed by the transport collection service or during the increase and decline periods of the seasonal/production trends.

The temperature of the milk monitored is especially crucial where there are more than one holding vat on the farm as the farmer has the opportunity to contaminate existing supplies or existing supplies may be contaminated because the refrigeration system was inadequate during the term of storage.

For example, the profile may indicate that the milk entered the vat at too high a temperature which meant that the vat cooling system could not cool the milk rapidly enough. Not only would this information indicate potentially the quality of the milk is poor, but would also suggest that the reason for the poor quality milk was the chiller through which the milk passed before entering the vat.

In preferred embodiments of the present invention the milk volume or weight of the milk in the vat is also measured and included with the temperature data. This is considered a particularly important aspect of the present invention. The temperature profile is useful in that it gives an indication of the quality of the milk. This information combined with the volume of milk can determine the degree of contamination that would occur if the poor quality of the milk was added to higher quality milk.

For example, a vat may hold milk from milkings that occurred on separate days. The temperature profile of the older milk may indicate that the milk has a poorer quality than the fresher milk. By knowing the volume of the older milk placed into the vat and the total volume of milk in the vat (and hence the net volume of the fresh milk) the overall quality of the milk can be determined. This information can be used to make decisions as to whether the milk will be collected, or if collected how the milk will be processed.

In preferred embodiments of the present invention, the data received by the sensor is transmitted to a central processing station. Suitable central processing stations may be a dairy factory or transport collection system.

The transmission may be by a variety of means, for example infra red, microwave link, radio transmission (such as UHF or VHF) or telephone network (such as Telecom land line or Cellnet phone system).

In other embodiments of the present invention the data may not necessarily be transmitted to a central processing station but may be recovered from the vat by a tanker driver. For example, there may be provided a "touch memory" system whereby the tanker driver accesses the data stored before collecting the milk. The tanker driver may have processing means (or the farmer) which determines from the temperature profile the likely quality of the milk. Thus, the tanker driver can elect whether to collect the milk or not depending on the quality of the milk. Alternatively, the tanker driver can transmit this information either directly (when the driver arrives at the depot) or remotely to a cental processing station.

In other embodiments, the transmission of the data to a central processing station may be activated manually by the farmer once the vat is full. For example, the farmer may dial the central processing station through a modem or activate the transmission by some other means.

In preferred embodiments however, there is provided telecommunication link with an automatic dial facility, obviating the need for the farmer to perform an extra task in the milking shed.

Preferably, the central processing station of determining the data being sensed or recorded, perhaps by dialling out.

The central processing station may be a depot or a factory or any device or location which preferably has the ability to use the data received from the sensors to make decisions as to how the milk can be processed.

For example, if the temperature profiles for milk collected by a particularly tanker indicate that the milk is likely to be of high quality, then that milk may be diverted for processing into milk powder. The processing of the temperature data may occur on site, in the tanker or at the central processing station.

In one embodiment of the present invention there may be an alarm system activated by predetermined parameters of the stored material such the temperature of the milk.

For example, if the chiller has broken down or the vat is not cooling sufficiently, this will be indicated by the temperature sensed. This may flag either the farmer alerting him/her to a fault, the tanker driver to miss collection or the central processing station which amongst other things could perhaps send out a repair person to the particular farm from which the alarm emanates.

The information being sensed may also be relayed to a farmer's computer for the farmer's own records.

In further embodiments of the present invention there may be provided an additional means of information transmission. This may be in the form of a bar-code identification system, although any other means of information transmission may also be used.

In embodiments including a bar-code identification system it is envisaged that there is an information relay allowing transfer of information to the identification system. This information relay may be attached either to the sensor, or ADC, or to any other suitable place. The identification system is thus supplied with information as to the contents of the milk vat. A means of outputting the information may also be provided in preferred embodiments.

In preferred embodiments of the present invention a farmer will have an identification card with a memory storage device. This card may include a bar-code which may be used to access the information in the identification system. The barcode may be swiped along a sensor in the system, or used in any other way to gain access to the information, after which the information may be downloaded to the storage device on the card. Any other similar means may also be used to access the information.

Once the information is accessed, the farmer may use it for any purpose he desires. For instance records may be made of the quantity of milk in the vat, or information provided to enable the farmer to manage his milk taking operation effectively. Preferably this information is only accessible by a selective means such as using an identification system.

The bar-code identification system may also function as a security system. In some embodiments information may only be taken from the tank, or any operation of the tank initiated, after insertion of the card containing the bar-code into the sensor. Thus the possessor of the identification card, preferably the farmer, can be in full control of the operation of the information release system.

In further embodiments of the present invention the operator of the tanker may have access to the bar-code identification system. The operator may use the information collected from the system to confirm records held at the central processing station. This enables a more accurate collection system to be used, and also may confirm for the farmer that his information as to the contents of the milk vat are correct. Alternatively there may be provided a means for the tanker operator to enter information into the system, for example the amount of milk taken, or the time of collection may also be entered into the system. The enables a two-way information processing system to be set up.

In further preferred embodiments of the present invention there may be provided a hard copy storage device which enables a permanent record of the information transmitted to the central processing station to be made.

In some embodiments this may be a hard copy printer. By keeping a hard copy record of the information sent to the central processing station, the damage of any failure in the communication link between the farm and the central processing station can be minimised. For instance, if the farmer is alerted a breakdown in the communication link, he may manually telephone the central processing station with the information supplied on his hard copy device, thus avoiding costly down time which would occur without a hard copy device.

In preferred embodiments the hard copy device may be linked to the sensor or the barcode identification system. Alternatively it may be connected to the ADC. In some embodiments the information is collected by the hard copy device and at some time subsequently transmitted to the central processing station.

The information stored on the hard copy device may also be useful for the farmer in maintaining a record of milk taking and storage. This information may include time series records of milk weight and liters in the milk vat, thus enabling predictions to be made as to future production. These predictions may be used in farm management at later times.

It should be appreciated that presently the quality of the milk is always tested for every collection. It is not envisaged that this test would be superseded by the collection of the temperature data only. One advantage however of having a temperature profile, is that it can be matched more directly to quality of milk thus giving more accurate predictions. If somehow the quality of milk is poor and this was not indicated by the temperature profile, then this would suggest the farmer has inadequate hygiene and should take a look at his/her cleaning routines.

It can be seen that the present invention provides a number of advantages over traditional systems.

As a consequence the installation of a remote data acquisition system, a complete management structure is implemented with live data being accessed by the respective processing dairy factory.

Total quality management is supported through the system. The live data accessed can be referenced to the producing dairy farm permitting the farmer and processing dairy factory to have complete analysis on quality and quantity of milk produced together the efficiencies of processing farm diary equipment including storage vats, milk silos or other holding vessels and the corresponding refrigeration/chiller systems.

Milk collection service completed by the dairy company milk tankers and private contractors may be aided by the availability of live data from the producing dairy farms.

The financial cost of the collection services are normally extremely high. The opportunity to achieve maximum loading percentages of collection vehicles at minimum cost will be supported as dispatch controllers may schedule collection vehicles and direct collection vehicles by the most efficient and direct route available to them, because the quality/volume of the milk is known through the present invention.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
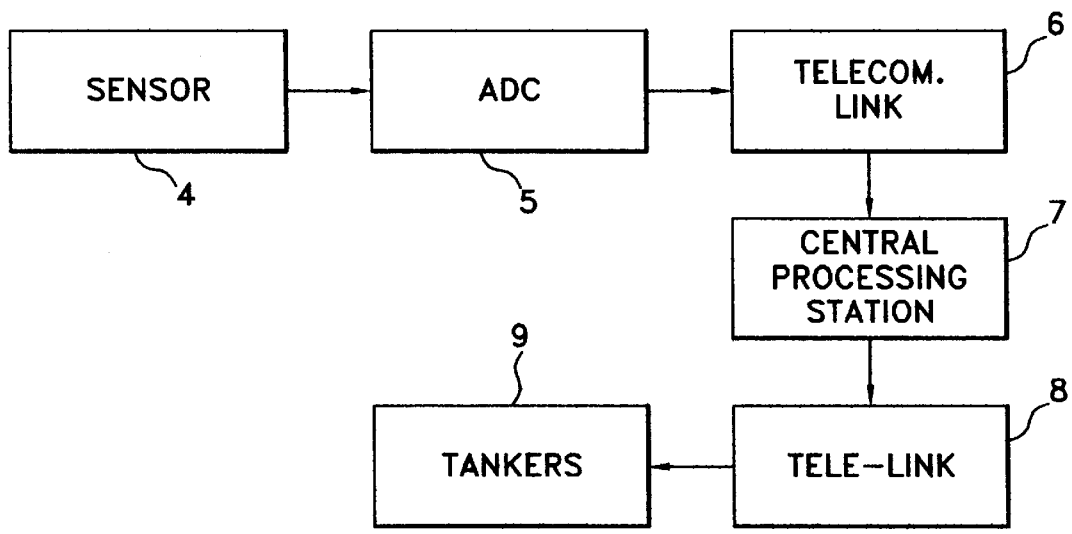
FIG. 1 is a block diagram illustrating the passage of the data received in accordance with the present invention.

FIG. 1 illustrates the path by which data collected in accordance with the present invention may travel.

Data from the sensor 4 may be converted from an analogue format to a digital format by the analogue to digital converter ADC 5. The digital information may then be transferred via a telecommunication link 6 to the central processing station 7.

Once the central processing station 7 receives the data, it may then calculate the best way to co-ordinate the tanker's movements. This information may then be communicated either manually over the phone lines or through a tele link 8 back to the tankers 9.

Figure 2:
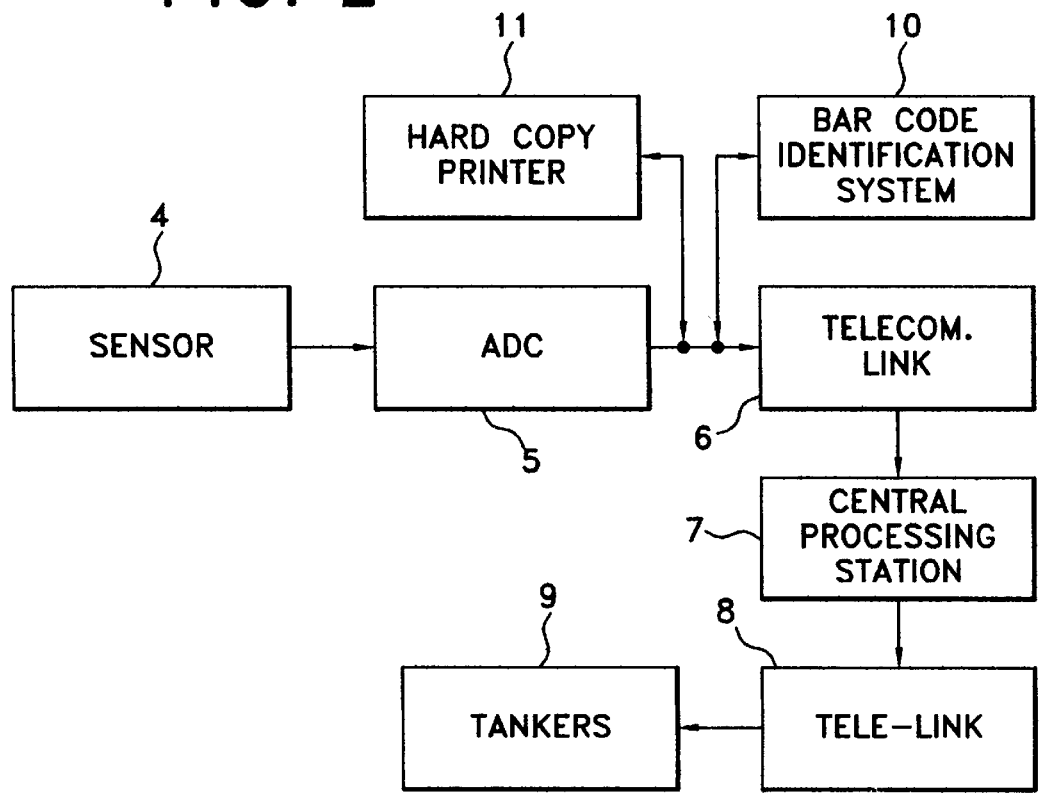
FIG. 2 is a block diagram illustrating the passage of the data received in accordance with a further embodiment of the present invention.

FIG. 2 illustrates the path by which data collected in accordance with a further embodiment of the present invention may travel.

In addition to the data pathway illustrated in FIG. 1, there is provided a barcode identification system 10 and a hard copy printer 11.

In this embodiment, data from the ADC 5 is transmitted both to the hard copy printer 11 and barcode identification system 10 before transmission to the central processing station 7. The data can then be output on the hard copy printer, or accessed through the barcode identification system, and used for whatever purpose the farmer desires.

Figure 3A:
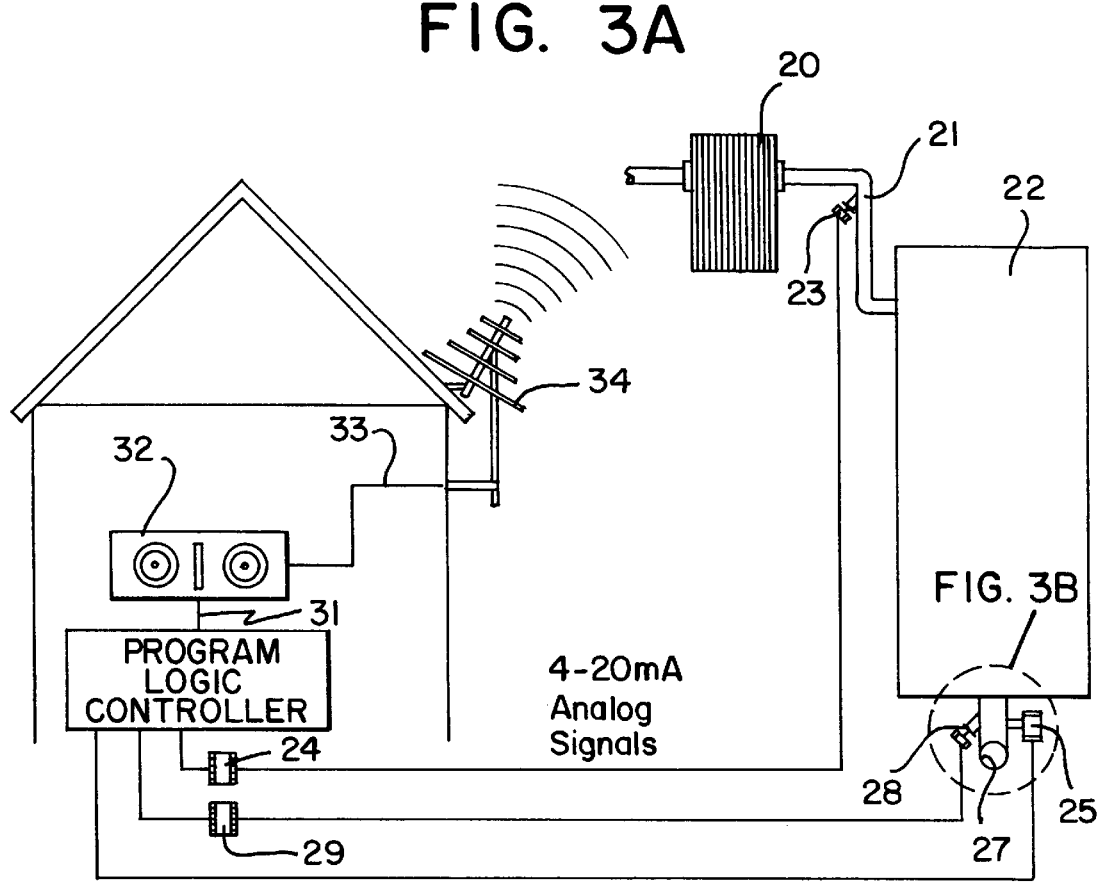
FIG. 3 is a conceptual plan relating to the working of one embodiment of the present invention.
Figure 3B:
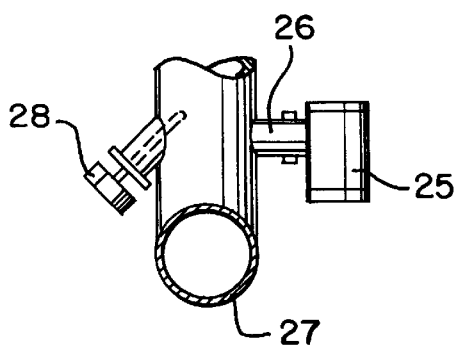

Referring now to FIG. 3, there is illustrated a conceptual plan of one embodiment of the present invention.

After milking, the milk passes through a plate beat exchanger along a pipe 21 and into a milk vat 22. On the pipe 21 is a temperature sensor 23 which is connected to a temperature transmitter 24.

At the base of the milk vat 22 is a Rosemount pressure transmitter 25. The transmitter 25 is connected to the base of the milk vat by a Tri-Clover clamp 26. Inserted into the outlet 27 of the milk vat is a PT100 temperature probe 28 which is also connected to a temperature transmitter 29.

The analog output from the temperature transmitters 23 and 29 and the pressure transmitter 25 enter a program logic controller 30 (PLC). The PLC 30 is connected by communication protocol RS232C 31 to a UHF radio 32. The radio 32 is connected by coaxial cable 33 to a transmitter aerial 34 which broadcasts the temperature and pressure signals to a central processing station (not shown).

Aspects of the present invention have been described by way of example only and it should be appreciated that modifications and additions may be made thereto without departing from the scope of the appended claims.

What I claim is:

1. A remote data acquisition system including a sensor included into a milk vat, the sensor capable of sensing the temperature of milk stored within the milk vat, the remote data acquisition system also including transmission means associated with the sensor capable of outputting the information sensed by the sensor, and a data storage device to store the information sensed, the remote data acquisition system also including a processing means capable of compiling a temperature profile from data stored in the data storage device, wherein the temperature profile provides an indication of the quality of milk stored within the milk vat.

2. A remote data acquisition system as claimed in claim 1 which includes an alarm system activated by the occurrence of a pre-determined temperature value of the stored milk.

3. A remote data acquisition system as claimed in claim 1 which incorporates an identification system.

4. A method of allocating the type of processing accorded to milk collected from a milk vat wherein the milk vat incorporates at least one sensor capable of reading the temperature of milk held within the milk vat, characterised by the steps of a) outputting temperature information sensed from the sensor to a central processing station, b) using the output temperature information to co-ordinate the processing accorded to milk within the milk vat, and c) processing information collected by the sensor to provide a temperature profile of the milk within the milk vat, wherein the temperature profile provides an indication of the quality of milk stored within the milk vat.

5. A method as claimed in claim 4 wherein an automatic dial facility is used to output the temperature information to a central processing station.

6. A method as claimed in claim 4 wherein the central processing station has the ability to use the temperature information it receives to make decisions how the milk will be processed.

* * * * *